(12) United States Patent
Paul et al.

(10) Patent No.: US 12,196,311 B2
(45) Date of Patent: Jan. 14, 2025

(54) TRANSMISSION DEVICE FOR AN ELECTRICALLY DRIVEABLE VEHICLE, DRIVE DEVICE FOR AN ELECTRICALLY DRIVEABLE VEHICLE, AND VEHICLE

(71) Applicant: Valeo Siemens eAutomotive Germany GmbH, Erlangen (DE)

(72) Inventors: Stefan Paul, Pinzberg (DE); Bernd Haas, Nuremberg (DE)

(*) Notice: Subject to any disclaimer, the term of this patent is extended or adjusted under 35 U.S.C. 154(b) by 218 days.

(21) Appl. No.: 17/779,721

(22) PCT Filed: Nov. 24, 2020

(86) PCT No.: PCT/EP2020/083123
§ 371 (c)(1),
(2) Date: May 25, 2022

(87) PCT Pub. No.: WO2021/105080
PCT Pub. Date: Jun. 3, 2021

(65) Prior Publication Data
US 2022/0412458 A1    Dec. 29, 2022

(30) Foreign Application Priority Data
Nov. 29, 2019   (DE) .................. 10 2019 132 506.4

(51) Int. Cl.
*F16H 63/34*   (2006.01)
*F16H 57/029*   (2012.01)
*F16H 57/02*   (2012.01)

(52) U.S. Cl.
CPC ....... *F16H 63/3458* (2013.01); *F16H 57/029* (2013.01); *F16H 2057/02026* (2013.01); *F16H 2057/02043* (2013.01)

(58) Field of Classification Search
CPC ......... F16H 57/029; F16H 2057/02026; F16H 2057/02043; F16H 63/3416;
(Continued)

(56) References Cited

U.S. PATENT DOCUMENTS

| 2013/0017719 A1* | 1/2013 | Tanaka | H01R 13/521 439/587 |
| 2016/0172784 A1* | 6/2016 | Kataoka | H01R 13/5219 439/271 |
| 2018/0112774 A1* | 4/2018 | Littlefield | F16H 63/3466 |

FOREIGN PATENT DOCUMENTS

| DE | 112007001716 T5 * | 5/2009 | ......... F16H 61/0006 |
| DE | 112013003098 T5 | 3/2015 | |

(Continued)

OTHER PUBLICATIONS

DE 102016214683 A1 (Christian Reisinger) Jan. 1, 2013 (full text). [online] [retrieved on Feb. 28, 2024]. Retrieved from: Clarivate Analytics. (Year: 2018).*

(Continued)

*Primary Examiner* — Joseph Brown
(74) *Attorney, Agent, or Firm* — Osha Bergman Watanabe & Burton LLP

(57) ABSTRACT

A transmission device (1) for an electrically drivable vehicle (29), comprising
a transmission element (2),
a parking lock (6), by means of which the transmission element (2) can be blocked,
a transmission housing (9), which encloses the transmission element (2) and the parking lock (6),
a connection apparatus (10) with a cable arrangement (11) extending in the transmission housing (9) and to the first end of which a plug connector (12) is attached, the plug connector being arranged in a transmission housing opening (14) for contacting the cable arrangement (11) from the exterior of the transmission housing (9) and having contact elements (25) arranged in a plug connector housing (15), wherein a second end of the cable arrangement (11) is connected to the parking lock (6), wherein the plug connector (12) has at least one (Continued)

sealing means (18, 27) for preventing a lubricant from escaping through the transmission housing opening (14).

11 Claims, 5 Drawing Sheets

(58) Field of Classification Search
CPC ............. F16H 63/3458; F16H 63/3466; H01R 13/5202; H01R 13/5221
See application file for complete search history.

(56) References Cited

FOREIGN PATENT DOCUMENTS

| DE | 102015217875 A1 | 3/2017 | | |
|---|---|---|---|---|
| DE | 20 2017 102174 U1 | 5/2017 | | |
| DE | 102016214683 A1 | * | 2/2018 | ............. F16H 63/34 |
| DE | 102017124499 A1 | | 4/2018 | |
| EP | 1256747 A2 | | 11/2002 | |
| EP | 3670973 A1 | | 6/2020 | |
| JP | H0930274 A | | 2/1997 | |
| JP | 2006275165 A | | 10/2006 | |
| JP | 2009121604 A | | 6/2009 | |
| WO | 2017/057070 A1 | | 4/2017 | |

OTHER PUBLICATIONS

Office Action Issued in corresponding EP Application No. 20 812 252.3, dated Jan. 23, 2024. ( 9 Pages ).
International Search Report and Written Opinion in corresponding International Application No. PCT/EP2020/083123, mailed Feb. 12, 2021 (15 pages).

* cited by examiner

TRANSMISSION DEVICE FOR AN ELECTRICALLY DRIVEABLE VEHICLE, DRIVE DEVICE FOR AN ELECTRICALLY DRIVEABLE VEHICLE, AND VEHICLE

FIELD OF THE INVENTION

The present invention relates to a transmission device for an electrically drivable vehicle, to a drive device for an electrically drivable vehicle, and to a vehicle.

BACKGROUND OF THE INVENTION

The document DE 10 2015 217 875 A1 discloses a drive system with an electric machine and a transmission for a motor vehicle. The transmission has a transmission output shaft and a transmission housing, and also a parking lock.

By integrating a parking lock in a transmission housing, construction space that is scarce, in particular with regard to the use of the transmission device in an electric drive device of a vehicle, can be saved. However, this poses special challenges due to the presence of lubricants and higher temperatures inside the transmission housing.

SUMMARY OF THE INVENTION

The invention is based on the object of specifying a construction-space-saving and low-outlay option for arranging a parking lock in a transmission housing.

This object is achieved according to the invention by a transmission device for an electrically drivable vehicle, comprising a transmission element, a parking lock by means of which the transmission element can be blocked, a transmission housing, which encloses the transmission element and the parking lock, a connection apparatus with a cable arrangement extending in the transmission housing and a plug connector, which is attached to a first end of the cable arrangement, is arranged in a transmission housing opening for contacting the cable arrangement from the exterior of the transmission housing and has contact elements arranged in a plug connector housing, wherein a second end of the cable arrangement is connected to the parking lock, wherein the plug connector has at least one sealing means for preventing a lubricant from escaping through the transmission housing opening.

The invention is based on the consideration of sealing the interior of the transmission housing in relation to the exterior of the transmission housing by means of the plug connector. The parking lock can thus be advantageously arranged inside the transmission housing in a manner saving on construction space without the operation of the transmission device being impaired by the lubricant escaping. The plug connector can be connected with little outlay to the transmission housing and constitutes, as it were, the necessary sealing of the transmission housing.

It is preferred in the case of the transmission device according to the invention if one sealing means comprises one or more sealing rings which are arranged between the plug connector housing and the transmission housing opening in a manner surrounding the plug connector housing. An escape of the lubricant through clearances between the transmission housing opening and the plug connector housing is thus avoided. Typically, the or a respective sealing ring is arranged in a plug connector housing groove running in the circumferential direction.

Expediently, the cable arrangement of the transmission device according to the invention has a plurality of individual cables which are electrically connected to in each case one of the contact elements of the plug connector.

It is particularly preferred here if one sealing means comprises a plurality of sealing elements which in each case seal one individual cable in relation to the plug connector housing. An escape of the lubricant through the plug connector can thus be effectively avoided.

It can advantageously be provided that the plug connector housing has a plurality of receiving chambers enclosing a respective individual cable axially fluidtightly, wherein a respective sealing element is arranged in one of the receiving chambers.

It is particularly advantageous here if the sealing elements are connected in a form-fitting manner to the individual cables, for example by crimping. This facilitates exchanging the plug connector or the cable arrangement in the event of one of these components being defective. This is true in particular in comparison to a conceivable alternative in which the individual cables are cast with the plug connector for sealing purposes, which would require the exchange of the entire connection apparatus in the event of a defect.

It is furthermore preferred if one or more individual cables are power cables for electrically supplying the parking lock, and/or one or more individual cables are signal cables for activating the parking lock.

It can be provided here that a primary triggering function of the parking lock can be supplied by means of one or more of the power cables and/or can be activated by means of one or more of the signal cables. Alternatively or additionally, it can be provided that a secondary triggering function, by means of which the transmission element can be blocked in the event of a malfunction of the primary triggering function, can be supplied by means of one or more of the power cables. The primary triggering function can be formed, for example, by an electric drive by means of which the parking lock can be driven in order to block the transmission element. The secondary triggering function can be formed, for example, by a magnet which releases a coupling, which is coupled to the electric drive for carrying out the primary triggering function, in order to drive the parking lock by means of a restoring force in order to block the transmission element.

In addition, it can be provided, in the case of the transmission device according to the invention, that a lubricant bath for lubricating the transmission element is provided in the transmission housing and the parking lock is at least partially located in the lubricant bath. Owing to the sealing according to the invention, an arrangement of the parking lock in the lubricant bath is consequently possible, as a result of which previously unused arrangement positions of the parking lock in the transmission housing are opened up.

The object on which the invention is based is furthermore achieved by a drive device for an electrically drivable vehicle, comprising an electric machine, a transmission device according to the invention, and a shaft which transmits a rotational motion of the electric machine to the transmission device.

It can be provided here that the transmission housing is part of a housing enclosing the electric machine, the transmission device and the shaft.

The drive device can furthermore comprise an inverter which is connectable or connected by means of a cable to the connection apparatus for activating and/or electrically supplying the parking lock.

Finally, the object on which the invention is based is also achieved by a vehicle, comprising a drive device according to the invention which is configured to drive the vehicle.

BRIEF DESCRIPTION OF THE DRAWINGS

Further advantages and details of the present invention emerge from the exemplary embodiments described below and on the basis of the drawings. These are schematic illustrations in which.

DETAILED DESCRIPTION OF THE INVENTION

Figure 1:
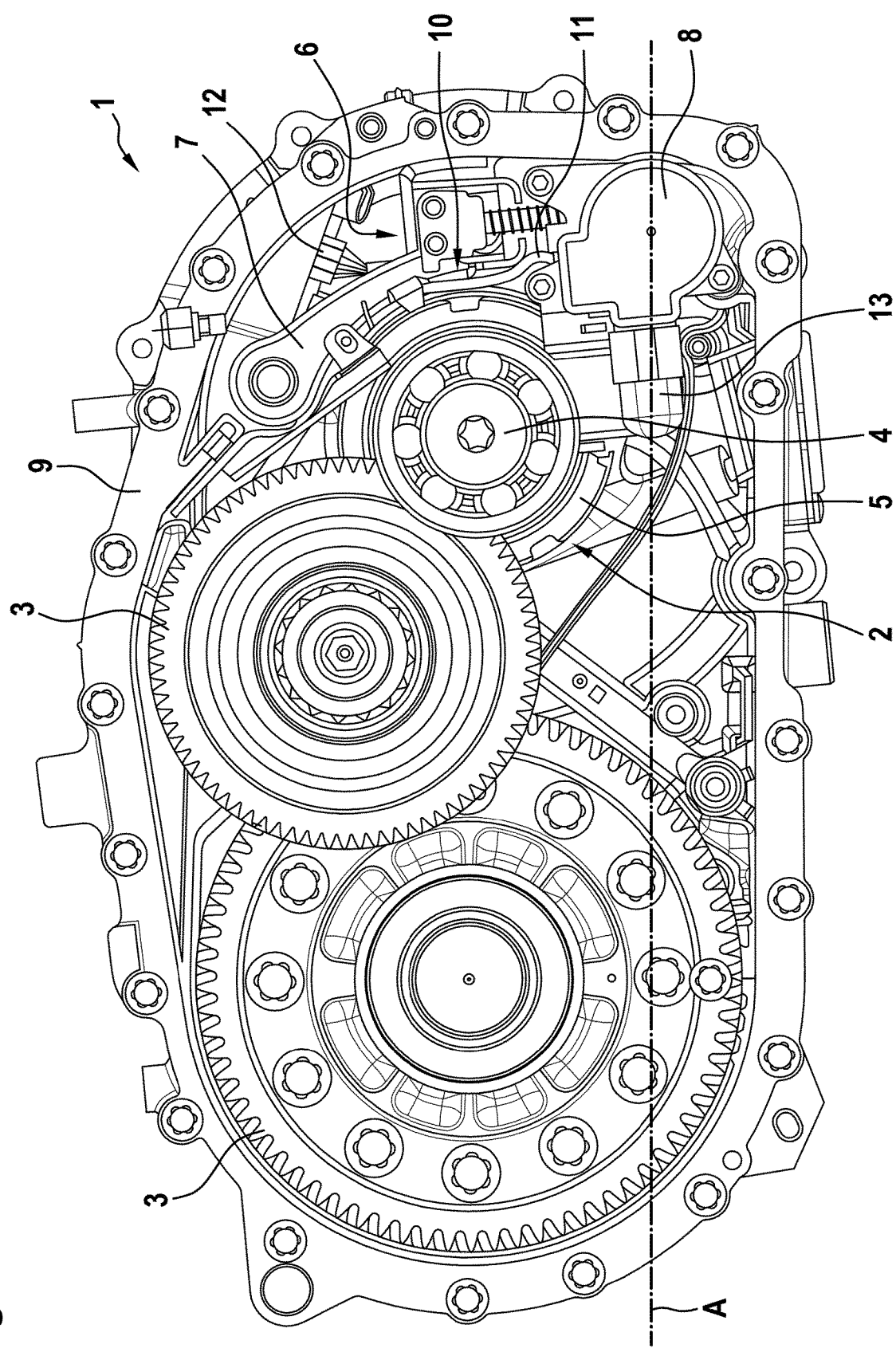
FIG. 1 shows a frontal view of an exemplary embodiment of the transmission device according to the invention in an open state.

FIG. 1 is a frontal view of an exemplary embodiment of a transmission device 1 in an open state.

The transmission device 1 comprises a transmission element 2 which is coupled to further transmission elements 3 in order to convert a rotational motion provided by a shaft 4, which is connected to the transmission element 2 for rotation therewith. Also fastened to the transmission element 2 is a parking lock wheel 5 of a parking lock 6, by means of which the transmission element 2 can be blocked. For this purpose, the parking lock 6 also has a parking lock pawl 7 which can be brought into engagement with the parking lock wheel 5 by means of a parking lock actuator 8 of the parking lock 6.

The transmission elements 2, 3 and the parking lock 6 are enclosed by a transmission housing 9. In order to lubricate the transmission elements 2, 3, the transmission device 1 has a lubricant bath, the operationally conventional filling level of which is indicated by a chain-dotted line A in FIG. 1. As can be seen, the parking lock 6 is partially located in the lubricant bath.

In addition, the transmission device 1 comprises a connection apparatus 10 which comprises a cable arrangement 11, a first plug connector 12, and a second plug connector 13. The plug connectors 12, 13 are attached at opposite ends of the cable arrangement 11, wherein the second plug connector 13 is connected to the parking lock actuator 8.

Figure 2:
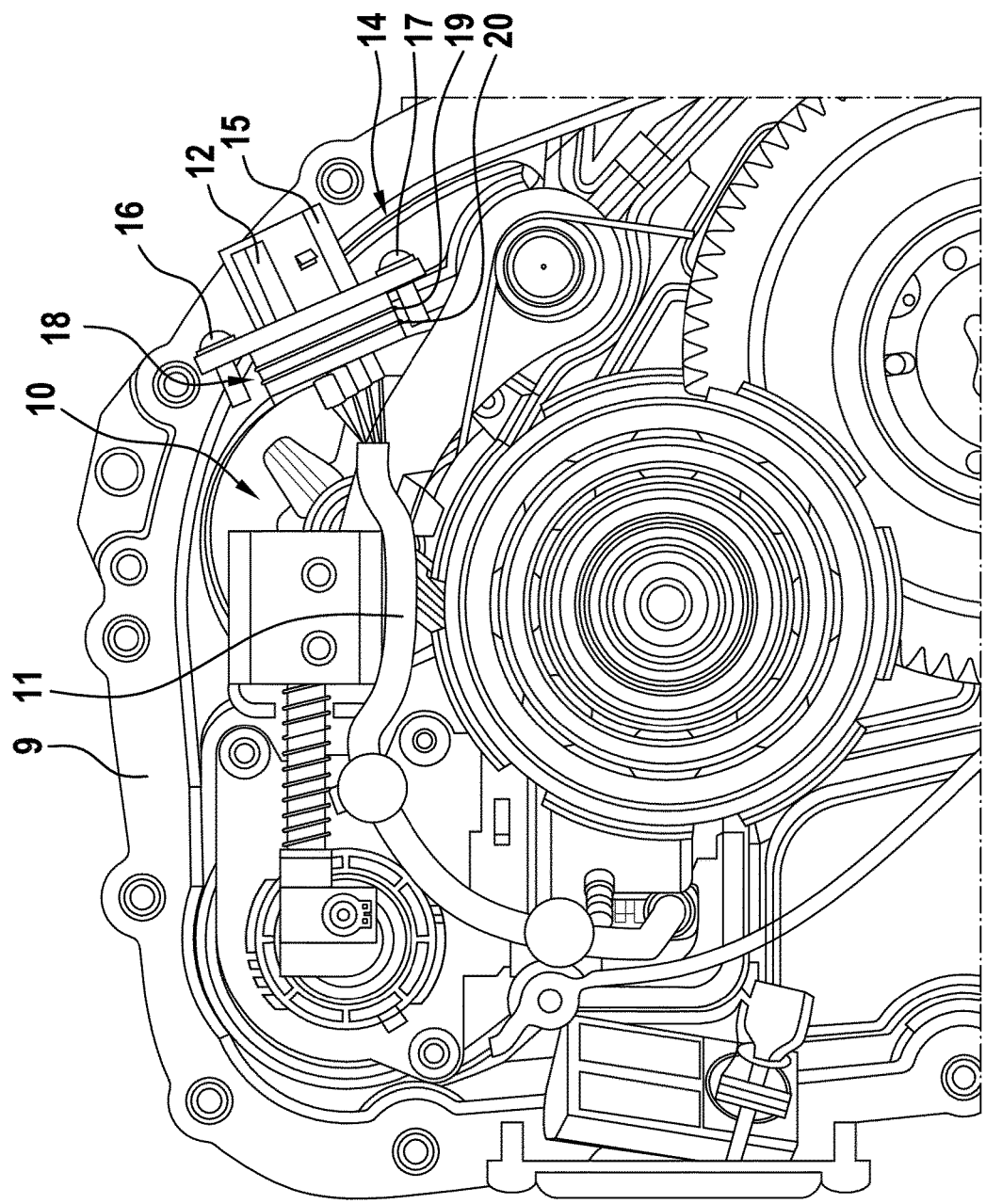
FIG. 2 shows a detailed view of the transmission device of the connection apparatus.

FIG. 2 is a detailed view of the transmission device 1 in the region of the connection apparatus 10.

The first plug connector 12 is arranged in a housing opening 14 for contacting the cable arrangement 11 from the exterior of the transmission housing 9. For this purpose, a plug connector housing 15 of the first plug connector 12 is flange-mounted on the transmission housing 9 by fastening means 16, 17.

The first plug connector 12 has a first sealing means 18 which comprises two sealing rings 19, 20. The sealing rings 19, 20 are arranged between the plug connector housing 15 and the transmission housing opening 14 in a manner surrounding the plug connector housing 15. The first sealing means serves for preventing the lubricant from escaping from the transmission housing opening 14, namely through an intermediate space between the first plug connector 12 and the transmission housing opening 14.

Figure 3:
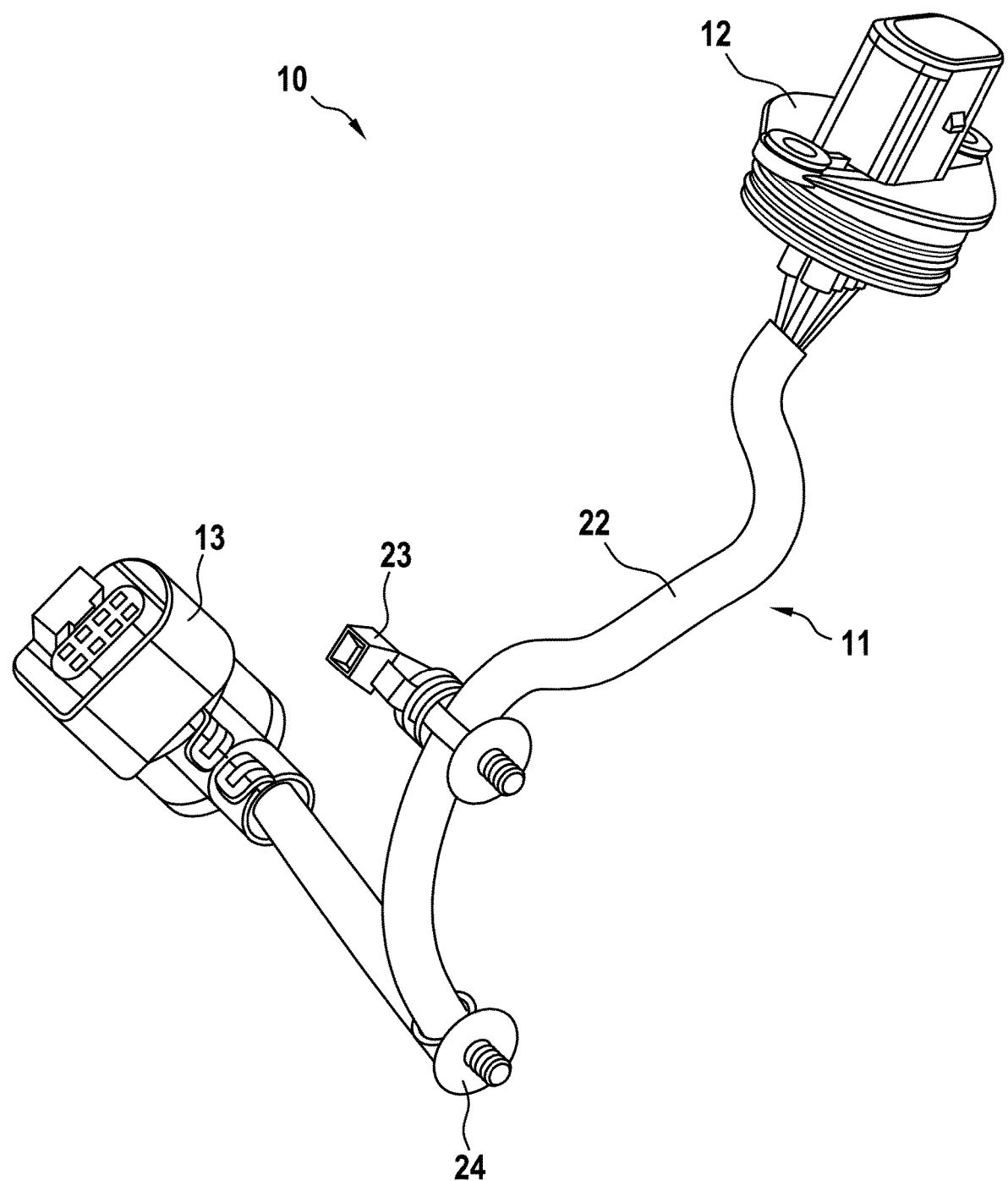
FIG. 3 shows a perspective detailed view of the connection apparatus.

FIG. 3 is a perspective detailed view of the connection apparatus 10.

FIG. 3 first of all shows that the cable arrangement 11 has a plurality of individual cables 21 which are surrounded by a fabric tube 22 between the plug connectors 12, 13. The high temperatures of up to 150° C. prevailing in the lubricant bath mean that the cable arrangement 11 meets high temperature requirements.

Four individual cables 21—power cables—for electrically supplying the parking lock actuator 8 are provided. Two power cables supply a primary triggering function, formed by an electric drive, of the parking lock actuator 8. Furthermore, two power cables supply a secondary triggering function which is formed by a solenoid for releasing a coupling of the electric drive and by means of which the transmission element 2 can be blocked in the event of a malfunction of the primary triggering function. For this purpose, in the released state of the coupling, a restoring force, which is stored in a spring element, is generated in the parking lock actuator 8. One individual cable 21 is a ground cable. In addition, two individual cables 21 are signal cables, by means of which a sensor signal of a position sensor can be transmitted to the parking lock 6.

The cable arrangement 11 furthermore has two cable clamps 23, 24, by means of which the connection apparatus 10 is fastened inside the transmission device.

Figure 4:
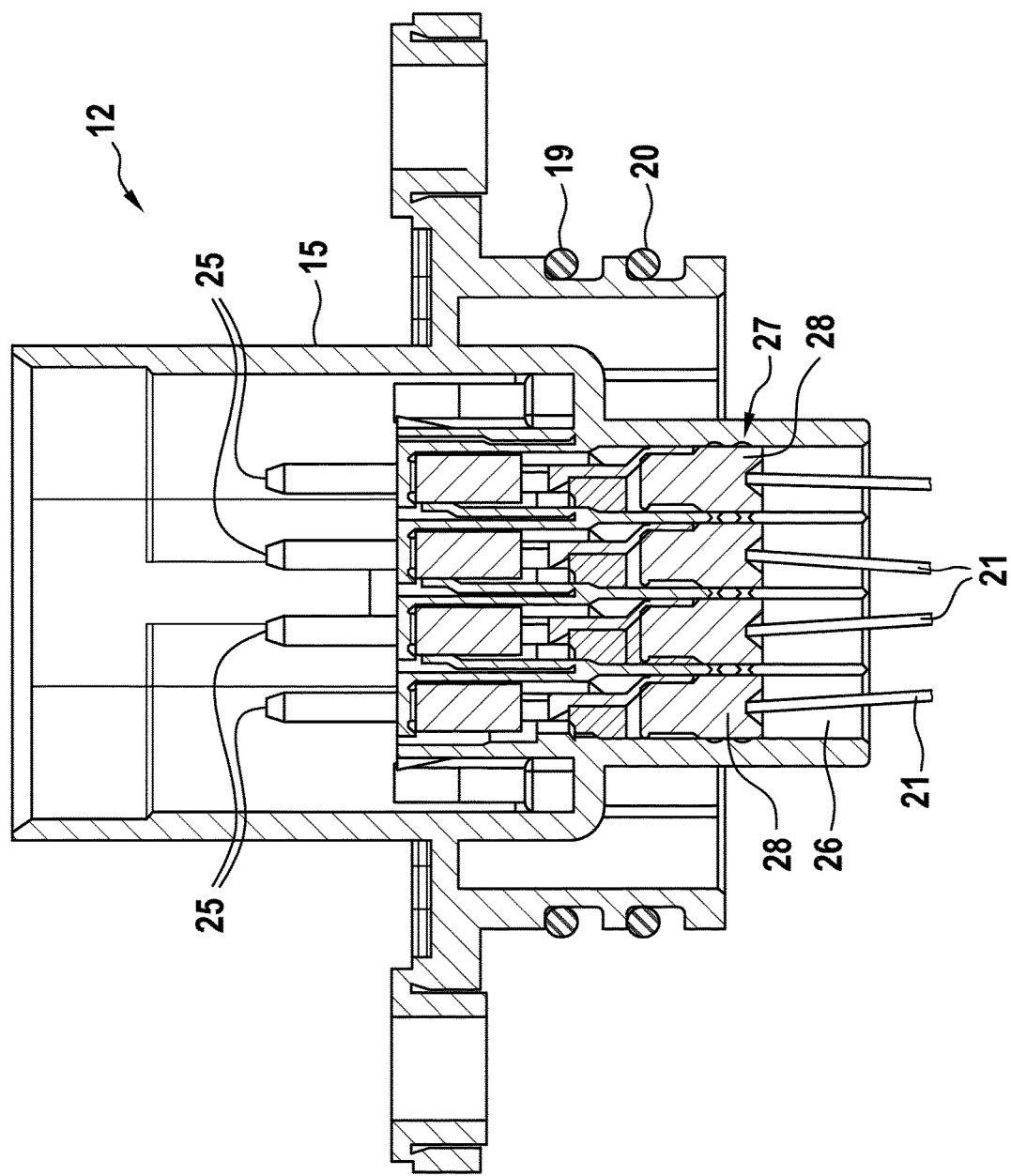
FIG. 4 shows a sectional illustration of the plug connector.

FIG. 4 is a sectional illustration of the first plug connector 12.

In addition to the plug connector housing 15, the first plug connector 12 comprises a plurality of contact elements 25 which are each connected in an electrically conductive manner to one of the individual cables. For each individual cable 21 and each contact element 25, the plug connector housing 15 has a receiving chamber 26 which encloses one of the individual cables 21 axially fluidtightly.

The plug connector has a second sealing means 27 which comprises a plurality of sealing elements 28 which in each case seal one individual cable 21 in relation to the plug connector housing 15. The sealing elements 28 are connected to the individual cables 21 by crimping and prevent the lubricant from escaping through the transmission housing opening 14.

Figure 5:
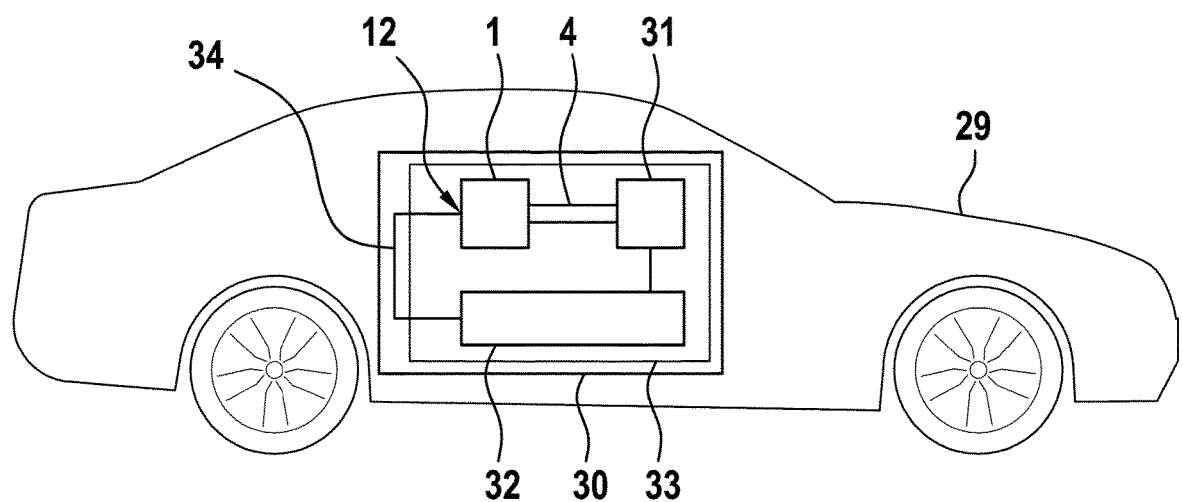
FIG. 5 shows a schematic diagram of an exemplary embodiment of the vehicle according to the invention with an exemplary embodiment of the drive device according to the invention.

FIG. 5 is a schematic diagram of an exemplary embodiment of a vehicle 29 according to the invention with an exemplary embodiment of a drive device 30 which is configured to drive the vehicle.

The drive device 30 comprises an electric machine 31 and the transmission device 1, which is configured for transmitting the rotational motion from the electric machine 31 to the transmission device 1 by means of the shaft 4. In addition, the drive device 30 comprises an inverter 32 which is configured to convert a DC voltage into a multi-phase AC voltage for electrically supplying the electric machine 31.

The transmission housing 9 (see FIG. 1) of the transmission device 1 is part of a housing 33 enclosing the electric machine 31, the transmission device 1, the shaft 4 and the inverter 32. The inverter 32 is connected to the first plug connector 12 of the transmission device 1 outside the housing 33 by means of a cable 34. Control signals of a control device of the inverter 32 are transmitted to the parking lock 6 (see FIG. 1) via the cable 34.

The invention claimed is:

1. A transmission device for an electrically drivable vehicle, comprising:
a transmission element;
a parking lock by which the transmission element is blocked;
a transmission housing, which encloses the transmission element and the parking lock;
a connection apparatus with a cable arrangement extending in the transmission housing and a plug connector, which is attached to a first end of the cable arrangement, is arranged in a transmission housing opening for contacting the cable arrangement from an exterior of the transmission housing and has contact elements arranged in a plug connector housing, wherein a second end of the cable arrangement is connected to the parking lock,
wherein the plug connector has at least one sealing means for preventing a lubricant from escaping through the transmission housing opening,
wherein the at least one sealing means comprises one or more sealing rings which are arranged between the plug connector housing and the transmission housing opening in a manner surrounding the plug connector housing,
wherein the cable arrangement has a plurality of individual cables which are each electrically connected to one of the contact elements of the plug connector,
wherein one or more individual cables are power cables for electrically supplying the parking lock, and/or one or more individual cables are signal cables for activating the parking lock.

2. The transmission device as claimed in claim 1, wherein the at least one sealing means comprises a plurality of sealing elements which each seal one individual cable in relation to the plug connector housing.

3. The transmission device as claimed in claim 2, wherein the plug connector housing has a plurality of receiving chambers enclosing a respective individual cable axially fluid tightly, wherein a respective sealing element is arranged in one of the receiving chambers.

4. The transmission device as claimed in claim 1, wherein
a primary triggering function of the parking lock is supplied by one or more of the power cables and/or can be activated by one or more of the signal cables, and/or
a secondary triggering function, by which the transmission element is blocked in the event of a malfunction of the primary triggering function, can be supplied by one or more of the power cables.

5. The transmission device as claimed in claim 4,
wherein the parking lock comprises an electric drive and a solenoid coupled to the electric drive,
wherein the primary triggering function is generated by the electric drive,
wherein the secondary triggering function is generated by the solenoid.

6. The transmission device as claimed in claim 1, wherein a lubricant bath for lubricating the transmission element is provided in the transmission housing and the parking lock is at least partially located in the lubricant bath.

7. A drive device for an electrically drivable vehicle, comprising:
an electric machine;
the transmission device as claimed in claim 1; and
a shaft transmitting a rotational motion of the electric machine to the transmission device.

8. The drive device as claimed in claim 7, wherein the transmission housing is part of a housing enclosing the electric machine, the transmission device, and the shaft.

9. The drive device as claimed in claim 7, further comprising
an inverter which is connectable or connected by means of a cable to the connection apparatus for activating and/or electrically supplying the parking lock.

10. A vehicle, comprising: the drive device as claimed in claim 7, which is configured to drive the vehicle.

11. The transmission device as claimed in claim 1, wherein a sensor signal of a position sensor is transmitted to the parking lock using the one or more signal cables.

* * * * *